(12) United States Patent
Mathur et al.

(10) Patent No.: US 7,307,702 B1
(45) Date of Patent: Dec. 11, 2007

(54) COLOR SWITCHABLE STRESS-FRACTURE SENSOR FOR DAMAGE CONTROL

(75) Inventors: Veerendra K. Mathur, Beltsville, MD (US); Jack L. Price, Rockville, MD (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 442 days.

(21) Appl. No.: 10/922,483

(22) Filed: Aug. 13, 2004

(51) Int. Cl.
    *G01B 11/16* (2006.01)
(52) U.S. Cl. .............................. 356/32; 356/35; 73/800
(58) Field of Classification Search .................. 356/32, 356/34; 73/800, 863.324, 862.624; 250/227.14, 250/227.18; 385/37, 36
See application file for complete search history.

(56) References Cited

U.S. PATENT DOCUMENTS

| | | | |
|---|---|---|---|
| 4,020,765 A | 5/1977 | Glass et al. | |
| 4,372,211 A | 2/1983 | Dante | |
| 4,473,747 A | 9/1984 | Brofardh | |
| 4,772,417 A | 9/1988 | Pappalardo et al. | |
| 4,991,150 A | 2/1991 | Wixom | |
| 5,446,334 A | 8/1995 | Gaffney | |
| 5,490,426 A * | 2/1996 | Shiga et al. ................... | 73/762 |
| 5,581,082 A | 12/1996 | Hansma et al. | |
| 5,905,260 A | 5/1999 | Sage | |
| 6,071,632 A | 6/2000 | Hall-Goulle | |
| 6,117,574 A | 9/2000 | Watanabe et al. | |
| 6,159,394 A | 12/2000 | Akiyama et al. | |
| 6,270,117 B1 | 8/2001 | Storey | |
| 6,281,617 B1 | 8/2001 | Qiu et al. | |
| 6,571,446 B2 | 6/2003 | Qui et al. | |
| 6,710,328 B1 | 3/2004 | Mastro et al. | |
| 2003/0124383 A1 | 7/2003 | Akiyama et al. | |
| 2004/0058150 A1 | 3/2004 | Geddes et al. | |
| 2004/0233347 A1 * | 11/2004 | Sage et al. ..................... | 349/56 |

OTHER PUBLICATIONS

T.J. Bencic. Rotating pressure measurements on a scale model high-bypass ratio fan using PSP at NASA LeRC. In fifth Ann. Pressure-Sensitive Paint Workshop, Arnold AFB, Tullahoma, TN (1997).

D. Jia, W. Jia, R. Meltzer, X. Wang, and W.Yen, "Persistent energy transfer in $CaAl_2O_4$ : Ce Tb phosphor", In 11th International Symposium on the Physics and Chemistry of Luminescent Materials, Philadelphia, PA, May 14-16, 2002.

(Continued)

*Primary Examiner*—Layla G. Lauchman
(74) *Attorney, Agent, or Firm*—Jane Barrow

(57) ABSTRACT

A color switchable stress/fracture sensor in combination with a structure. The combination apparatus includes a structure requiring stress and/or fracture detection, and at least one elasto-mechanoluminescent material at least partially dispersed in and/or on the structure and/or in a coating on the structure. The combination apparatus further includes at least one fracto-mechanoluminescent material at least partially dispersed in and/or on the structure and/or in a coating on the structure, and at least one fiber optic cable positioned to receive and transmit sufficient light emitted from the elasto-mechanoluminescent material due to stress applied to the elasto-mechanoluminescent material and to receive and transmit sufficient light emitted from the fracto-mechanoluminescent material due to fracture of the fracto-mechanoluminescent material.

3 Claims, 1 Drawing Sheet

OTHER PUBLICATIONS

"DERA Propose Triboluminescent Damage Sensors," Aug. 27, 1999, Institute of Physics Website (http://www.iop.org) at http://www.iop.org/Physics/News/0154j (1 page).

Sage, R. Badcock, L. Humberstone, N. Geddes, M. Kemp and G. Bourhill, "Triboluminescent Damage Sensors," Smart Materials and Structures, vol. 8, No. 4, pp. 504-510 (Aug. 1999); electronic copy available from Institute of Physics Website (http://www.iop.org) at http://www.iop.org/EJ/S/1/N91002209/journal/0964-1726 (electronic copy, 7 pages.

"Development of Mechanolumlnescence Materials" A.M. Gadjiko, V.K. Mathur, J. Zaykoski was made at the Electrochemical Society Meeting, May 9-12, 2004, San Antonio, TX. Only abstract was published. Available on Worldwide Web Feb. 12, 2004.

Stephen Mastro, V.K. Mathur, "Fibert Optic Composite Damage Detection System", American Society of Naval Engineers Annual Meeting 2003, Phil. Pa. (5 pages).

V.K. Mathur, J.H. Barkyoumb, Andrew Jarrett, Stephen Mastro, "Emission Characteristics of a Damage Sensor Material," International Symposium on Luminescense, 201 Electrochemical Society Meeting, 2002, Philadelphia, PA (1 page).

Akiyama, Morito, Xu, Chao-Nan and Nonaka, Kazuhiro, "Improvement in Mechanoluminescence Intensity of Ca2AL2SiO7 by the Statistical Approach", Journal of the Electrochemical Society, 150, pp. H115-H118 (2003).

Xu, Chao-Nan, Watanabe, Tadahiko and Akiyama, Morito, "Direct view of stress distribution in solid by mechanoluminescense", Applied Physics Ltr, vol. 74, No. 17, pp. 2414-2416.

Xu, Chao-Nan, Zheng, Xu-Guang, Akiyama, Morito, Nonaka, Kazuhiro and Watanabe, Tadahiko, "Dynamic Visualization of Stress Distribution by Mechanoluminescence Image", Applied Physics Ltr., vol. 76, No. 2, pp. 179-181 Jan. 10, 2000.

Bell, James H., Schairer, Edward T., Hand, Lawrence A. and Mehta, Rabindra D., "Surface Pressure Measurements Using Luminescent Coatings", Annu. Rev. Fluid Mech. pp. 155-206 2001.

Mastro, Stephen and Mathur, Veerendra, "Spectral and Environmental Characterization of Triboluminescent Sensor Material for Damage Detection", Carderock Division Research Digest, pp. 1-4, FY01-02, Publically Available After Aug. 13, 2004.

* cited by examiner

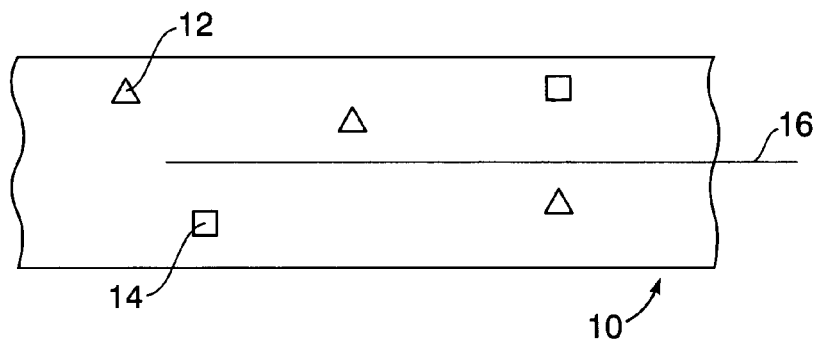
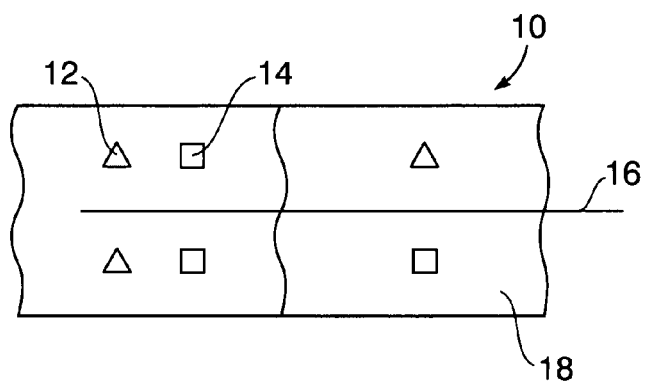
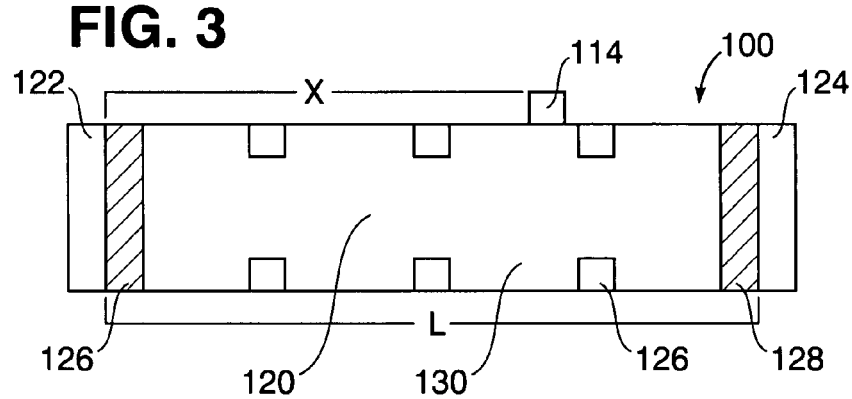

COLOR SWITCHABLE STRESS-FRACTURE SENSOR FOR DAMAGE CONTROL

STATEMENT OF GOVERNMENT INTEREST

The invention described herein may be manufactured and used by or for the Government of the United States of America for governmental purposes without the payment of any royalties thereon or therefore.

BACKGROUND OF THE INVENTION

1. Field of the Invention

This invention relates to color switchable sensors, and more particularly, to a color switchable sensor containing both fracto-mechanoluminescent and elasto-mechanoluminescent materials for both visually and remotely detecting the transition point between stress and fracture in a structure, e.g., aircraft and/or ship components possibly due to hydrodynamic drag, by an optic waveguide.

2. Description of the Prior Art

Glassy, plastic, polymer and composite among many different structural materials during both manufacture and use require integrity and robustness monitoring in situ and in real time in order to ascertain damage leading to failure of the structure. Usually, the failure is the result of a progression from initial stress to the structure to an eventual fracture. Monitoring the stress on a structure would allow for repair of the structure prior to fracture. Sage et al. in U.S. Pat. No. 5,905,260 recites to a damage sensor using triboluminescent materials connected to light guiding fibres or layers embedded within the structure or mounted on the structure's surface to detect the physical damage to the structure. The triboluminescent materials disclosed in Sage et al. are all fracto-mechanoluminescent materials emitting different wavelengths of light when fractured. The wavelength of emission can be used, through an algorithm, to directly locate the position of the fracture.

There is a need to know prior to the occurrence of a fracture where and when a fracture could occur to a structure in order that a fracture can be prevented with repair.

BRIEF DESCRIPTION OF THE DRAWINGS

These and other objects, features and advantages of the invention, as well as the invention itself, will become better understood by reference to the following detailed descriptions when considered in connection with the accompanying drawings wherein like reference numerals designate identical or corresponding parts throughout the several views, and wherein:

FIG. 1 shows a sectional view of a structure containing both elasto-mechanoluminescent and fracto-mechanoluminescent materials and fiber optical cables (detectors not shown) dispersed throughout a structure;

FIG. 2 shows a perspective view of a coating having both elasto-mechanoluminescent and fracto-mechanoluminescent materials on a surface of a structure and fiber optic cables (detectors not shown) dispersed throughout the coating; and FIG. 3 shows a schematic drawing of a structure containing a fracto-mechanoluminescent crystal and an embedded partially cladded optic fiber containing detectors and light dispersion elements.

DETAILED DESCRIPTION OF THE PREFERRED EMBODIMENT

Referring now to the drawings, the method of fabrication and the structures containing both fracto-mechanoluminescent and elasto-mechanoluminescent materials dispersed therethrough and/or thereon involves the following: the present invention provides a color switchable sensor. One embodiment consists of a structure having dispersed therethrough both elasto-mechanoluminescent material, fracto-mechanoluminescent materials and fiber optic cables for detecting at least two different visible light emissions. Another embodiment consists of a structure having either dispersed therethrough or thereon both elasto-mechanoluminescent, fracto-mechanoluminescent materials and fiber optic cables for detecting at least two different visible light emissions. Another embodiment consists of a structure having a coating containing both elasto-mechanoluminescent and fracto-mechanoluminescent materials and fiber optic cable for detecting at least two different visible light emissions. Another embodiment consists of a structure and a coating thereon and both elasto-mechanoluminescent and fracto-mechanoluminescent materials dispersed therethrough and fiber optic cables for detecting at least two different visible light emissions.

Triboluminescent materials are crystalline materials that emit visible wavelengths of light resulting from stress, fracture or plastic deformation of the material that can be detected by optic fiber cable with and/or without the length of the cable including a cladding. U.S. Pat. No. 6,710,328 to Mastro et al., Fiber Optic Composite Damage Sensor, is incorporated herein by reference. Triboluminescent materials include both elasto-mechanoluminescent and fracto-mechanoluminescent materials. Elasto-mechanoluminescent materials will emit light when the material is stressed, e.g., hydrodynamic stress (pressure or shear). Fracto-mechanoluminescent materials emit light when the material is fractured and not emit light when the material is stressed.

Fracto-mechanoluminescent materials are not elasto-mechanoluminescent materials and elasto-mechanoluminescent materials are not fracto-mechanoluminescent materials. Once fracture of a fracto-mechanoluminescent material occurs, all wavelengths of light being emitted due to stress on the elasto-mechanoluminescent material tends to cease and the light emission from the fracture of the fracto-mechanoluminescent material dominates.

Fracto-mechanoluminescent materials emit visible light under mechanical fracture of the material and not stress. Some of the high intensity fracto-mechanoluminescent materials are $EuD_4TEA$, europium tetrakis triethylammonium, and $BaAl_2Si_2O_8$, hexacelsiam doped with rare earth ions, e.g., Samarium, Ytterbium, and Cerium. $EuD_4TEA$ emits an orange-red color peaking at 610 nm upon fracture of the fracto-mechanoluminescent material. Terbium complex will emit green with a strong peak at 545 nm, Mn complex emit around 515 nm and ester at about 450 nm. The hexacelsiam doped with Samarium emits red, doped with Ytterbium emits green and doped with Cerium emits blue light.

Elasto-mechanoluminescent materials emit visible light under elastic deformations in absence of plastic deformation or fracture, i.e., due to stress, shear or load. Some of the high intensity elasto-mechanoluminescent materials are $ZnS:Mn$, $ZnGa_2O_4:Mn$, $Sr_3Al_2O_6$:rare earth element, $MgGa_2O_4$, $BaAl_2Si_2O_8$:rare earth, $Sr_3Al_2O_6$:rare earth, $Ca_2Al_2SiO_4$:rare earth element, $Ca_2Al_2SiO_7$, Gehlenite, which is doped with Ce (one of the brightest elasto-mechanoluminescent materials), ZnMnTe and $ZrO_2$:Ti. The rare earth element can be Eu. The rare earth elements appear to be quite suitable as their emission possibly is due to the f-f transition, which is not effected by the host lattice. It has been found that $Sr_3Al_2O_6$:Eu has a peak emission at 520 nm (green), ZnMnTe has emissions at 386 and 648 nm and $ZrO_2$:Ti has a peak emission at 480 nm. The elasto-mechanoluminescent materials have to be charged with UV irradiation before stress measurements. Successive stress cycles decrease the intensity of the materials but UV irradiation restores the intensity. It has been found that the intensity of the elasto-mechanoluminescent material is proportional to the stress applied. This relationship is exponential and not linear. Stress can be quantified by measuring the intensity of the emission. The emissions take place when the stress occurs and when the stress is removed.

The fiber optic cable, light dispersive element and photodetectors together are referred to as a fiber optic cable system. Fiber optic cable itself includes both a core and a cladding. There are two modes in which of fiber optic cable can detect the optical signal, i.e., point and distributive. In the point mode, cable receives the light at its tip and transmits the light along the length of the cable. In the distributive mode, cable has had cladding removed in discrete sections, channels, along the length of the cable. This allows the light to be detected at these discrete points along the entire length of the cable and to be transmitted to the photodetectors located at each end. Adjacent each detector is a light dispersive element. The light dispersive material, e.g., a prism or a grating separates light of different colors. It separates the elasto-mechanoluminescent and the fracto-mechanoluminescent emissions into the different wavelengths. Appropriate filters can also be used for this purpose. The sections of cable with the cladding are impermeable to the light and the sections of the cable where the cladding has been removed are permeable to the light. In either case, light is transmitted along the core. For position sensing, photodetectors are placed at both ends of the optic fiber. Thus, when an event takes place, light pulses enter the optic fiber and travel to photodetectors placed a both ends of the fiber. These pulses will generate electrical signals in the photodetector, which can be then recorded/displayed on a device such as an oscilloscope (not shown). By monitoring the time difference between the electrical pulses from the two photodetectors, an algorithm can determine the position of the event.

Both elasto-mechanoluminescent and fracto-mechanoluminescent materials are dispersed on/throughout the structure and/or in a coating on a structure or dispersed in isolated locations of the structure and/or coating. FIGS. 1 and 2 show a structure 10 containing elasto-mechanoluminescent materials 12 and fracto-luminescent materials 14. Fiber optic cables 16 are dispersed throughout the structure and/or coating 18 in proximity with the both the elasto-mechanoluminescent and fracto-mechanoluminescent materials in order to detect and transmit at least some of the emitted light to photodetectors, which are remotely located.

FIG. 3 is a schematic illustration through which one can locate the position of a fracture in a long structure 100 with an embedded partially cladded optic fiber 120 containing detectors 122 and 124 and light dispersive elements 126, 128 at each end. When a fracto-mechanoluminescent crystal 114 fractures, the emission from the fracto-mechanoluminescent enters the fiber through a non-cladded portion, channel, 130 of the fiber and travels to each of the detectors 122 and 124 through the light dispersive elements 126 and 128. L is the total length of the fiber 122 to 124, and X is the distance of the fractured crystal from 114 to 122 and L-X is the distance from the fracture 114 to the 124. With reference to FIG. 3 assume the length of optic fiber is L. If a fracture occurs at a distance X from the detector 122, then the following cases may arise: When X=L/2, the light signal generated by the fracture will arrive at the detectors 122 and 124 at the same time. When the electric pulses generated by the detectors 122 and 124 due to light signals are displayed on an oscilloscope they will coincide. A second case, is found when X<L/2, the electrical pulse from detector 122 will arrive earlier than the pulse from detector 124. The time difference $\Delta T$ between the pulses multiplied by the velocity of light V in fiber, where V=C/$\mu$, where C is the velocity of light in a vacuum and $\mu$ is the refractive index of the fiber, will give the optical path difference between the two pulses. The position of the fracture with respect to 122 is given by:

$$X = L/2 - \Delta T \times V/2 \qquad \text{I}$$

A third case, is found when X>L/2, the electrical pulse from 124 will arrive earlier than the pulse from 122. Then the position of the fracture from 122 is given by:

$$X = L/2 + \Delta T \times V/2 \qquad \text{II}$$

A structure can be any structure that can be physically damaged, e.g., parts of ship and airplane structures, such as a propeller from hydrodynamic conditions, e.g., cavitation. A structure and/or coating on the structure can be composed of glassy, plastic, composite, rubber, metal or the like materials. The elasto-mechanoluminescent and fracto-mechanoluminescent materials can be dispersed deep within the structure, at or near its surface, in specific locations, or in a coating on the surface of the structure. The fiber optic cable that receives at least some of the emitting light and transmits light to photodetectors needs to be positioned sufficiently near the elasto-mechanoluminescent and fracto-mechanoluminescent materials for the cable to receive and transmit at least some of the emitted light so that stress and/or fracture of the material is clearly detected and monitored. A structure or coating containing both elasto-mechanoluminescent material that emits visible light and fracto-mechanoluminescent material selected to emit a different color, i.e., wavelength of light than the elasto-mechanoluminescent material, are dispersed therethrough and/or thereon and/or in a coating can be designed so that upon the application of stress visible color from only the elasto-mechanoluminescent material will emanate from the stressed elasto-mechanoluminescent material and be detected along the length of an optical fiber that is in proximity with the elasto-mechanoluminescent material. As the stress increases so does the intensity of the color. At a point in time there is a transition point where a fracture occurs in the fracto-mechanoluminescent material and a different visible light is emitted now from the fracto-mechanoluminescent material and detected along the length of the fiber optic cable that is in proximity with the fracto-mechanoluminescent material.

This color switching from elasto-mechanoluminescent material to fracto-mechanoluminescent material will indicate stress that caused the fracture. The selection of the specific elasto-mechanoluminescent and the specific fracto-mechanoluminescent materials is based on each having a difference wavelength of light emitted provides for a color switchable damage sensor. The selection of the fracto-mechanoluminescent material is based on the material only emitting visible light when fractured and not emitting visible light when stressed. Each of the materials is dispersed along with fiber optic cables in a structure and/or coating for detecting the color emission and transmitting the light to photodetectors in or on the structure of concern in any desired location of the structure.

A composite structure can be designed to contain, for example, microcrystals of $ZrO_2$:Ti and $EuD_4TEA$. Under stress the $ZrO_2$:Ti will emit a bluish green color at 480 nm. The intensity of the emission will increase with a concomitant increase in stress, shear or load on the structure. At the point of fracture, the $EuD_4TEA$ will start emitting an orange-red color at 610 nm. The point at which this change in color takes place will denote the stress at which the fracture takes place, the transition point. By having both an elasto-mechanoluminescent, fracto-mechanoluminescent materials and fiber optic cables dispersed therethrough or thereon the structure and/or the coating, the monitoring of stress-fracture transition in real time in situ at places which might not be available for visual inspection.

EXAMPLES

I

Europium tetrakis (dibenzoylmethide) triethylammonium ($EuD_4TEA$) ($C_{66}H_{60}EuNO_8$) was chosen for these studies due to high brightness and ease of preparation. $EuD_4TEA$ was synthesized following the procedure of Hurt et al., C. R. Hurt, N. McAvoy, S. Bjorklund and N. Filipescu, *Nature*, 212, 179 (1966). The following procedure was followed:

1. Dissolved 2 m mols of $EuCl_3$ in 10 ml of ethyl alcohol ($CH_3CH_2OH$).

2. Dissolved 8 m mols of dibenzoylmethane $[(C_6H_5CO)_2CH_2]$ and 8 m mols of triethylamine $[(C_2H_5)_3N]$ in 60 ml of absolute ethyl alcohol.

Solution 1 was mixed with solution 2 at 60° C. The mixture was allowed to cool slowly at room temperature overnight. It was filtered and washed repeatedly with ethanol until no chlorine ion was detected with silver nitrate (0.1 mol). The crystalline product was air-dried.

II $EuD_4TEA$ was embedded in clear epoxy by mixing one part by weight of $EuD_4TEA$ and three parts by weight of clear epoxy and then molded in a disc of 25 mm diameter and 15 mm thick. On fracturing the disc, an orange-red emission at 610 nm was observed.

III

Titanium doped Zirconium Oxide ($ZrO_2$:Ti) was prepared following the method of Akiyama et al., M. Akiyama, C. Xu and K. Nonaka, *Appl. Phys. Lett.*, Vol. 81, p. 457, 2002, from $ZrO_2$ (purity 99.99%) and $TiO_2$ (purity 99.99%) powders. These powders were weighed and mixed in ethanol for half an hour. The mixture was then pressed in the form of pallets, put into cylindrical crucibles and slowly inserted into the furnace containing Argon at a slightly reducing atmosphere. The temperature increments were 3-5° C./min, with the optimum sintering temperature at 1500° C. and the corresponding sintering time at 4 hours.

IV

Gehlenite ($Ca_2Al_2SiO_7$:Ce) was prepared by two different methods. The first method is based on a two steps process. The non-stoichiometric composition of pure Gehlenite was first prepared from powders of $CaCO_3$, $\alpha$-$Al_2O_3$, and $SiO_2$ of high purity. The samples were sintered for 3 hours in the atmosphere at 1300° C. The bulk material of pure $Ca_2Al_2SiO_7$ was grounded, weighed and doped with (0.01%-0.005% mol of Ce). The powders were mixed with 0.2% mol of $H_3BO_3$ as flux in the ethanol for about half an hour. The mixed powders were loaded into the cylindrical crucibles, shaken during 3 minutes and slowly inserted into the furnace with reducing atmosphere (Ar+5% $H_2$). The temperature was increased at a rate of 3-5° C./min until it reached 1450° C. and maintained constant for 3 hours.

The second method was similar to the method of Akiyama et al., M. Akiyama, C. Xu and K. Nonaka, *Appl. Phys. Lett.*, Vol. 81, p. 457, 2002. The powders of $CaCO_3$, $SiO_2$, $\alpha$-$Al_2O_3$, $CeO_2$ and $H_3BO_3$ were mixed in ethanol for half an hour and the same sintering conditions applied as for the last step of the first method. The intensity Gehlenite prepared by the first method was 35% greater than the Gehlenite prepared by second method.

V

Both $ZrO_2$:Ti and $Ca_2Al_2SiO_7$:Ce were embedded in clear epoxy (one part elasto-mechanoluminescent material and three part epoxy) and molds of 25 mm diameter and 15 mm thickness were made. The UV excitation showed that $ZrO_2$:Ti and $Ca_2Al_2SiO_7$:Ce emitted at 480 nm and 427 nm respectively. These emissions are the same as the elasto-mechanoluminescent material emissions expected of these materials. Both were than subjected to a load of 400 lbs. The intensity of elasto-mechanoluminescence for $ZrO_2$:Ti was six times higher than the background and intensity of the elasto-mechanoluminescence for $Ca_2Al_2SiP_7$:Ce was twice the background. For $ZrO_2$:Ti, the minimum load which could be detected through elasto-mechanoluminescence was 40 lbs.

Prophetic Example I

When both fracto-mechanoluminescent material $EuD_4TEA$ and elasto-mechanoluminescent materials $ZrO_2$:Ti and $Ca_2Al_2SiO_7$:Ce are embedded in a structure and stress is applied only elasto-mechanoluminescent materials will emit at 480 nm or 427 nm, respectively. However, when the stress becomes sufficient to cause fracture, the fracto-mechanoluminescent material emission at 610 nm is to be observed. This color change gives the indication that the magnitude of the stress is such that it eventually causes fracture and the switching of the color emission from either 480/427 nm to 610 nm thereby indicating the transition point.

Therefore what has been described above is a structure that uses fracto-mechanoluminescent and elasto-mechanoluminescent materials dispersed therethrough and/or thereon and/or within a coating and a fiber optic cable for detecting a specific visible light emitted due to the stress to the elasto-mechanoluminescent material and a different specific visible light emitted due to the fracture of a fracto-mechanoluminescent material and the transition point when the visible light from the elasto-mechanoluminescent material tends to cease being emitted as the fracto-mechanoluminescent material is fractured and its emission of the different visible light.

Other embodiments of this invention will be apparent to those skilled in the art from a consideration of this specification or practice or the invention disclosed herein. Various omissions, modifications and changes to the principles described may be made by one skilled in the art without departing from the true scope and spirit of the invention, which is indicated by the following claims.

What is claimed is:

1. A color switchable stress/fracture sensor in combination with a structure comprising:
    a structure requiring stress and/or fracture detection;
    at least one elasto-mechanoluminescent material at least partially dispersed in and/or on said structure and/or in a coating on said structure;
    at least one fracto-mechanoluminescent material at least partially dispersed in and/or on said structure and/or in a coating on said structure; and
    at least one fiber optic cable positioned to receive and transmit sufficient light emitted from said elasto-mechanoluminescent material due to stress applied to said elasto-mechanoluminescent material and to receive and transmit sufficient light emitted from said fracto-mechanoluminescent material due to fracture of said fracto-mechanoluminescent material; and wherein said elasto-mechanoluminescent material and said fracto-mechanoluminescent material emit light at different wavelengths, wherein said fracto-mechanoluminescent material only emits light when fractured and does not emit visible light when stressed, wherein said elasto-mechanoluminescent material, said fracto-mechanoluminescent material and said cable are arranged to detect stress and/or fracture in said structure, and wherein said cable includes at least a partially cladded core, at least one detector and at least one light dispersive element at each end of said cable.

2. The color switchable stress/fracture sensor of claim 1, wherein said light dispersive element is a prism.

3. The color switchable stress/fracture sensor of claim 1, wherein said light dispersive element is a grating.

* * * * *